United States Patent [19]

Koike et al.

[11] 4,407,721

[45] Oct. 4, 1983

[54] PROCESS FOR MANUFACTURING POWDER FOR MAGNETIC RECORDING MEDIUM

[75] Inventors: Yoshiyasu Koike, Chigasaki; Osamu Kubo; Tadashi Ido, both of Yokohama; Masanobu Uwaha, Kawasaki, all of Japan

[73] Assignee: Tokyo Shibaura Denki Kabushiki Kaisha, Kawasaki, Japan

[21] Appl. No.: 304,683

[22] Filed: Sep. 22, 1981

[30] Foreign Application Priority Data

Sep. 22, 1980 [JP] Japan ................................ 55-132130

[51] Int. Cl.$^3$ ........................ C04B 35/26; C01G 49/00
[52] U.S. Cl. .............................. 252/62.59; 252/62.63; 423/594
[58] Field of Search .................... 423/594; 252/62.58, 252/62.59, 62.63

[56] References Cited

U.S. PATENT DOCUMENTS

| 3,549,315 | 12/1970 | Lester et al. | 423/594 |
| 3,716,630 | 2/1973 | Shirk | 252/62.58 X |
| 4,233,169 | 11/1980 | Beall | 252/62.59 |
| 4,278,556 | 7/1981 | Tada | 252/62.63 X |
| 4,341,648 | 7/1982 | Kubo et al. | 252/62.59 X |

FOREIGN PATENT DOCUMENTS 367466 3/1973 U.S.S.R. .......................... 252/62.58

*Primary Examiner*—Jack Cooper
*Attorney, Agent, or Firm*—Oblon, Fisher, Spivak, McClelland & Maier

[57] ABSTRACT

A process for manufacturing a hexagonal ferrite magnetic powder for a magnetic recording medium involves rapidly cooling a molten material of a glass-forming component and a hexagonal ferrite-forming component to obtain glass flakes, heating the glass flakes to precipitate ferrite fine grains, incompletely dissolving the glass flakes with an acid or boiling water, and separating and recovering the fine grains in the presence of a dispersing agent.

11 Claims, 1 Drawing Figure

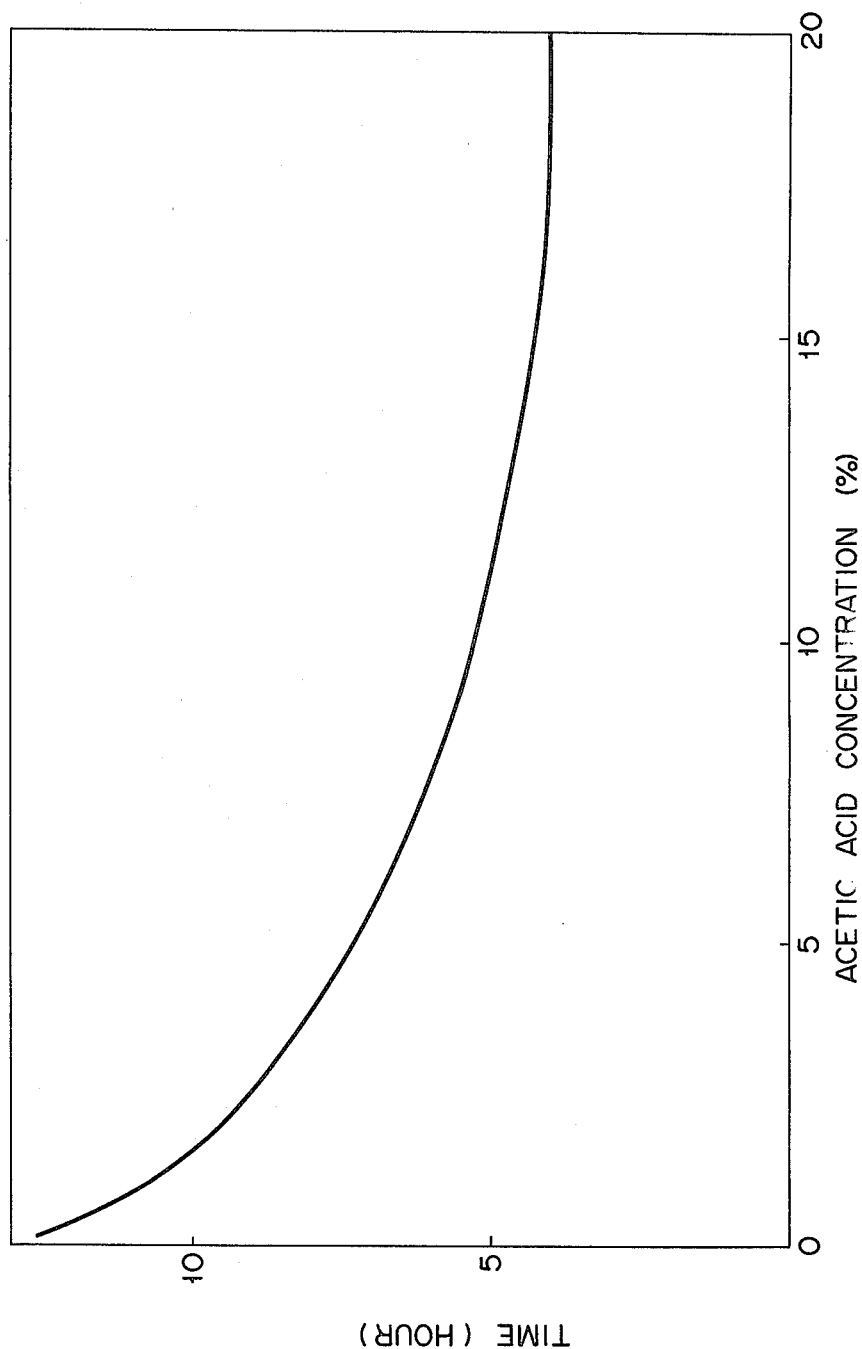

PROCESS FOR MANUFACTURING POWDER FOR MAGNETIC RECORDING MEDIUM

BACKGROUND OF THE INVENTION

The present invention relates to a process for manufacturing a magnetic powder used for manufacture of a magnetic recording medium.

Recent magnetic recording media such as magnetic recording tapes adopt the vertical magnetic recording method which utilizes magnetization in the direction perpendicular to the surface of the magnetic recording medium in order to improve the recording density. The vertical magnetic recording method is suitable for high density recording since the magnetic field is reduced more as the recording density increases. The magnetic recording medium according to this recording method requires a magnetic recording film which has an axis of easy magnetization in the direction perpendicular to the surface thereof. Such a recording film is formed by sputtering Co-Cr or by coating magnetic fine grains of hexagonal ferrite on a base material.

The formation of the magnetic recording film by coating will be described in more detail. The magnetic fine grains are mixed with a suitable binder and the mixture is coated on base material such as a nonmagnetic tape. Subsequently, by arranging the coating in a magnetic field such that the surface crosses perpendicularly the direction of the magnetic field, the axis of easy magnetization of the respective fine particles in the coating are aligned along the direction of the magnetic field. Finally, the coating is dried to provide a recording medium with a recording film for vertical magnetic recording.

In the manufacture of such a magnetic recording medium, several factors are important in relation to the characteristics of the obtained magnetic recording medium. First, hexagonal ferrite has a very high coercive force, resulting in a defect in that the magnetic head becomes saturated during recording. For this reason, the coercive force must be reduced to a value suitable for vertical magnetic recording, for example, about 1,000 Oe, by substituting particular atoms with part of the atoms of the ferrite. Secondly, the grain size of the crystalline fine grains of the hexagonal ferrite must be selected to be within the range of 0.01 to 0.3 $\mu$m. If the grain size is less than 0.1 $\mu$m, a magnetic effect strong enough for magnetic recording may not be obtained. When it is over 0.3 $\mu$m, a multi-magnetic domain results. Therefore, the coercive force obtained becomes smaller than the desired coercive force. And the surface coarseness of the magnetic recording film becomes great. These are disadvantageous for vertical magnetic recording. Thirdly, the magnetic fine grains having the grain size as defined above must be uniformly dispersed within the binder. The magnetic fine grains tend to flocculate due to their own magnetism and the flocculation force is strong. When magnetic fine grains thus flocculated are used, the surface precision of the magnetic recording medium obtained is not good. This adversely affects various characteristics causing noise generation and a drop in output.

SUMMARY OF THE INVENTION

It is an object of the present invention to provide a process for manufacturing hexagonal magnetic fine grains for a magnetic recording medium which have suitable grain size and which do not flocculate.

In order to achieve the above and other objects, there is provided according to the present invention a process for manufacturing a magnetic powder for a magnetic recording medium comprising the steps of:

uniformly mixing and melting a hexagonal ferrite-forming component and a glass-forming component as a precipitating base material of fine grains of the hexagonal ferrite;

rapidly cooling the resultant molten material to provide glass flakes;

thermally treating the glass flakes to precipitate the fine grains of hexagonal ferrite therein;

incompletely dissolving the glass flakes containing the precipitated fine grains with boiling water or an acid which is capable of dissolving glass; and separating and recovering the precipitated fine grains from the incompletely dissolved glass flakes in the presence of a dispersing agent.

According to the process for manufacturing a magnetic powder of the present invention, the magnetic fine grains obtained are separated from each other. Even if they are magnetically attracted together, they are naturally and freely separated when coated on the base material. Therefore, the surface coarseness of the magnetic recording film of the magnetic recording medium using this magnetic powder is extremely small, so that a magnetic recording medium of excellent characteristics may be obtained.

BRIEF DESCRIPTION OF THE DRAWING

The FIGURE is a graph showing the relationship between the concentration of acetic acid and the optimal dissolving time, in the step of incompletely dissolving the glass flakes containing the precipitated fine grains which are crystalline and magnetic.

DETAILED DESCRIPTION OF THE PREFERRED EMBODIMENTS

Fine grains of hexagonal ferrites such as barium ferrite, strontium ferrite, and lead ferrite may be precipitated in a glass base material. Although the following description will be made with particular reference to barium ferrite, the same effects are similarly obtainable with the other hexagonal ferrites. Barium ferrite-forming components are prepared from basic components containing the constituting elements and substituting components for controlling the coercive force to a predetermined value. The basic components may be $BaO$ and $Fe_2O_3$. The substituting components may be $TiO_2$, $CoO$, $ZnO$, $Nb_2O_5$, $V_2O_5$, $Al_2O_3$, $ZrO_4$, $SiO_2$, $Cr_2O_5$ and $Sb_2O_3$. These ferrite-forming components are mixed and melted with glass-forming components. Although the ferrite-forming components as described above also contribute to the formation of glass as the base material, the components other than the ferrite-forming components are called the glass-forming components herein. The glass-forming components may thus include $B_2O_3$, $H_3BO_3$, $P_2O_5$, $SiO_2$ and $Na_2O$. The mixing ratios of the respective ferrite-forming components and glass-forming components may be suitably determined according to the composition of the desired barium ferrite.

The uniformly mixed and molten mixture of the ferrite-forming components and the glass-forming components is rapidly cooled by injecting it between rotary rolls, for example, as a cooling medium to form glass flakes. The glass flakes are then thermally treated at a temperature within the range of 550° to 900° C. for 2 to 10 hours to precipitate fine grains of barium ferrite having a desired coercive force and grain size. When the temperature of the heat treatment is less than 550° C., the ferrite fine grains do not form. When the temperature of the heat treatment is over 900° C., the grain size becomes too great, providing a magnetic powder unsuitable for a magnetic recording medium.

The glass flakes containing the precipitated ferrite fine grains are washed with an acid or with boiling water to incompletely dissolve the glass. The degree of dissolution of the glass is important; the dissolving process must be stopped while the glass is still present around the ferrite fine grains. If the glass is completely dissolved, the ferrite fine grains are separated from each other and cause secondary flocculation. In this case, dispersion of the fine grains becomes difficult even in the presence of a dispersing agent. The optimal dissolving time varies according to the kind and concentration of acid used, the dissolving time, and so on. For example, FIG. 1 shows the relationship between the concentration of acetic acid (%) and the optimal dissolving time (hr) at a dissolving temperature of 90° C., when the glass flakes are dissolved with acetic acid. The acid to be used is not limited to acetic acid; acids such as hydrochloric acid which are capable of dissolving glass may be used, and boiling water may alternatively be used.

The glass flakes incompletely dissolved in an acid or boiling water are mechanically pulverized or chemically dissolved in the presence of a dispersing agent to release the ferrite fine grains. When the glass is pulverized or dissolved, the dispersing agent simultaneously becomes attached to the surface of the respective ferrite fine grains. Since the dispersing agent is thus attached to the surface of the ferrite fine grains which are freed from the glass, the ferrite fine grains do not flocculate and may be recovered under a separated condition.

As example of preferable dispersing agent is a phosphoric ester of the general formula:

wherein X and Y represent $-(OCH_2CH_2)_nH$ (where n is an integer of 1 to 50), $-OR$ (where R is an alkyl group or an alkyl aryl group), or $-(OCH_2CH_2)_nOR$ (where n and R are as defined above); and Z is $-OH$ or any of the groups described above. Preferable phosphoric esters may include alkyl(polyoxyethylene)diester phosphate; triester, dimethyl or trimethyl phosphate; dioctyl or trioctyl phosphate; didecanoyl or tridecanoyl phosphate; trioleyl phosphate and so on. The reason why a phosphoric ester is effective for the surface treatment of the ferrite fine grains is that the phosphoric acid group bonds with a metal atom such as barium. As a result of this, the alkyl group or the like which is compatible with the organic binder is present at the surface of the ferrite fine grains. The osmotic power of the phosphoric ester is so strong that the phosphoric ester may penetrate into the gaps between the glass and the ferrite fine grains. This osmotic action is further facilitated by mechanical vibrations.

The dispersing agent other than the phosphoric ester may be a compound selected from the group consisting of lecithin, amine compounds, ammonium compounds, higher fatty acids, metallic soaps of the higher fatty acids, higher fatty acid esters, alkyl sulfonates, and polyoxyethylene ethers and esters. Specifically, the dispersing agent may include lecithin, triethanolamine, alkyltrimethylammonium halogenide, stearic acid, and oleic acid; metallic soaps of the higher fatty acids such as aluminum stearate; higher fatty acid esters such as sorbitan ester; sodium dialkylsulfosuccinate; sodium alkylbenzenesulfonate; sorbitan fatty acid ester; polyoxyethylenealkylphenol ether; and so on.

Such a dispersing agent is preferably added to the incompletely dissolved glass flakes after the removal of the acid for higher efficiency in dissolving the glass. However, the dispersing agent may be added to the glass flakes simultaneously with the addition of the acid or the boiling water for dissolving the glass. In this case, the pulverizing step may be started immediately after the completion of the dissolving step. In the pulverizing step, a glass slurry containing the fine grains obtained from the dissolving step is placed in a container having an ultrasonic generator or in a general wet type mixing machine or a dispersing machine for dispersing fine grains such as a gringing mill, a visco mill, a sand grinder, an attriter, a ball mill, a rod mill, or a vibration mill. At the same time, glass, a metal, or a refractory material such as $Al_2O_3$, $ZrO_4$, or agate in the form of balls or rods is added. The mill is rotated and operated under the wet condition.

The amount of the dispersing agent to be added is 2 to 8 parts by weight, preferably 3 to 5 parts by weight based on 100 parts by weight of the magnetic powder contained in the glass flakes before the step of incomplete dissolving. The time for mechanically pulverizing the glass flakes is preferably within a range which allows the ferrite fine grains to be completely separated from the glass and yet does not allow the crystalline fine grains to be damaged; it is preferably 2 to 4 hours.

The fine grains of the hexagonal ferrite manufactured according to the process of the present invention are separate from each other and do not strongly flocculate. Therefore, when this magnetic powder is mixed with a binder and the mixture is coated on a base material, a magnetic recording film having excellent surface characteristics may be obtained. When the conventional magnetic powder is used, the flocculating tendency of the grains is strong so that the surface coarseness of the magnetic recording film is generally 0.1 to 0.2 μm. In contrast with this, the surface coarseness of the magnetic recording film according to the present invention may be less than 0.1 μm. The magnetic recording medium using the magnetic powder according to the present invention has excellent electomagnetic conversion characteristics and greatly reduced modulation noise.

The present invention will now be described in more detail with reference to its examples, but is not limited thereto.

EXAMPLE 1

$BaFe_{10.4}Co_{0.8}Ti_{0.8}O_{19}$, which is magnetoplumbite barrium ferrite in which $Co^{2+}$ and $Ti^{4+}$ ions are substituted for part of the $Fe^{3+}$ ions for obtaining a suitable coercive force, was manufactured in the manner to be described below.

A well-blended mixture of 13.4% by weight of $B_2O_3$, 38.6% by weight of BaO, 41.8% by weight of $Fe_2O_3$, 3.2% by weight of $TiO_2$, and 3.0% by weight of CoO was put in a platinum crucible. The mixture was heated and melted at 1,350° C. by a high frequency heater. The resultant molten material was passed between rolls of 200 μm diameter and 100 to 1,000 rpm rotational frequency to provide glass flakes. The glass flakes were heated at 800° C. for 4 hours in an electric furnace to precipitate fine grains of barium ferrite.

The glass flakes were held in a 20% by weight aqueous solution of acetic acid at 90° C. for 4 hours. The glass flakes were then drained and observed with a transmission type electron microscope having a magnification factor of 30,000. Small amounts of the glass were observed to be present between the ferrite fine grains. To these glass flakes were added 100 parts by weight of water and 4 parts by weight of dioctyl phosphate based on 100 parts by weight of the magnetic powder in the glass flakes before the dissolving step. The mixture was pulverized in a sand grinder for 2 hours. The pulverized material was filtered by a filter, washed with water, dried by a spray drier, and further dried by a vacuum drier at 80° C. The obtained ferrite fine grains were observed by the transmission type electron microscope to be separated from each other. The grain size was also confirmed to be within the range of 0.01 to 0.3 μm.

The resultant ferrite magnetic powder was mixed with an organic binder such as a vinyl chloride-vinyl acetate copolymer, polyurethane or the like by a general method. The mixture was coated on a polyester film as a base material and the coated surface was calendered. The surface coarseness of the magnetic recording film of the magnetic recording tape obtained from the magnetic powder was 0.1 μm at maximum. As for the electromagnetic converion characteristics, the modulation noise was confirmed to be −42 dB at a recording wavelength of 0.6 μm.

For the purpose of comparison, a ferrite magnetic powder as manufactured in the same manner as described above except that dioctyl phosphate was not used. A magnetic recording tape was manufactured therefrom. The surface coarseness of the magnetic recording film of this magnetic recording tape was confirmed to be 0.3 μm at maximum. The modulation noise was −30 dB at a recording wavelength of 0.5 μm. The values are inferior to those obtainable with the magnetic powder according to the present invention. Furthermore, the output dropped significantly at a recording wavelength below 1.0 μm.

EXAMPLE 2

Glass flakes containing precipitated ferrite fine grains obtained in a similar manner as in Example 1 described above were put in an ultrasonic cleaner together with a 20% by weight aqueous solution of acetic acid. The flakes were subjected to ultrasonic vibration at 90° C. for 2 hours. GaFaC was further added, in the amount of 4 parts by weight based on 100 parts by weight of the magnetic powder in the glass flakes. The mixture was subjected to ultrasonic vibrations for 8 more hours to separate the ferrite fine grains. The obtained ferrite fine powder was dried at 80° C., and a magnetic recording tape was manufactured therefrom according to the general method. The surface coarseness of the magnetic recording film of this magnetic recording tape was 0.1 μm at maximum. The modulation noise was about −42 dB at a recording wavelength of 0.6 μm.

What we claim is:

1. A process for manufacturing a hexagonal ferrite magnetic powder for a magnetic recording medium comprising the steps of:
   uniformly mixing and melting hexagonal ferrite-forming components and a glass-forming component as a base material for precipitated fine grains of the hexagonal ferrite;
   rapidly cooling the resultant molten material to provide glass flakes;
   thermally treating the glass flakes to precipitate the fine grains of the hexagonal ferrite therein;
   incompletely dissolving the glass flakes containing the precipitated fine grains to a degree that glass remains present around the fine grains, said dissolution being achieved with boiling water or an acid which is capable of dissolving glass;
   mechanically pulverizing the precipitated fine grains and the incompletely dissolved glass flakes in the presence of a dispersing agent capable of preventing flocculation of fine grains of ferrite and
   separating and recovering the precipitated fine grains from the incompletely dissolved glass flakes, said grains being within the range of 0.01 to 0.3 microns and when incorporated into a recording film of a magnetic recording tape effecting a magnetic recording medium having a surface coarseness of not more than 0.1 microns.

2. A process according to claim 1, wherein the dispersing agent is a phosphoric ester of the general formula:

wherein X and Y represent $-(\text{OCH}_2\text{CH}_2)_n\text{H}$ (where n is an integer of 1 to 50), $-\text{OR}$ (where R is an alkyl group or an alkyl aryl group), or $-(\text{OCH}_2\text{CH}_2)_n\text{OR}$ (where n and R are as defined above); and Z is $-\text{OH}$ or any of said groups.

3. A process according to claim 1, wherein the dispersing agent is a compound selected from the group consisting of lecithin, amine compounds, ammonium compounds, higher fatty acids, metallic soaps of the higher fatty acids, higher fatty acid esters, alkyl sulfonates, and polyoxyethylene ethers and esters.

4. A process according to claim 1 or 2, wherein the dispersing agent is added in an amount of 2 to 8 parts by weight based on 100 parts by weight of the fine grains in the glass flakes before incompletely dissolving the glass flakes.

5. A process according to claim 1, wherein the dispersing agent is added to the glass flakes after the glass flakes are incompletely dissolved.

6. A process according to claim 1, wherein the dispersing agent is added to the glass flakes together with an acid and boiling water before the glass flakes are incompletely dissolved.

7. A process according to claim 1, wherein the ferrite-forming component comprises basic components of $BaO$ and $Fe_2O_3$, and substituting components of $TiO_2$ and $CoO$ for control of coercive force.

8. A process according to claim 1, wherein the glass-forming component is $B_2O_3$ or $H_3BO_3$.

9. A process according to claim 1, wherein the temperature for thermally treating the glass flakes is within the range of 550° to 900° C.

10. A process according to claim 1, wherein the acid for incompletely dissolving the glass flakes is acetic acid or hydrochloric acid.

11. A process according to claim 1, wherein glass is present between the ferrite fine grains in the incompletely dissolved glass flakes.

* * * * *